Dec. 1, 1964    H. L. MUSSETT ETAL    3,159,395
HOLDER FOR GLASS BALL JOINTS
Filed Feb. 12, 1962

INVENTORS
HARRY L. MUSSETT
FRED C. RUSTENBACH
BY
*William J. Miller*
ATTORNEY

United States Patent Office 3,159,395
Patented Dec. 1, 1964

3,159,395
HOLDER FOR GLASS BALL JOINTS
Harry L. Mussett and Fred C. Rustenbach, Ponca City, Okla., assignors to Continental Oil Company, Ponca City, Okla., a corporation of Delaware
Filed Feb. 12, 1962, Ser. No. 172,477
8 Claims. (Cl. 269—254)

This invention relates to an apparatus for holding a glass ball joint while it is being sealed to a piece of glassware. The apparatus further permits the application of air pressure to the sealing joint and internal portion of the glassware during the sealing process in order to maintain the dimensions and shape of the joint and glassware while both are being subjected to heat.

In the manufacture of chemical apparatus normally constructed of glass, it often becomes necessary to attach thereto numerous glass joints. The glass joints are used in order to permit physical separation of one piece of chemical apparatus from another and to make a piece of apparatus readily adaptable for other uses. For physical or technical reasons, it is often necessary that the glass joints so mounted have an extremely short seal, that is, the length of tubing connecting the ball joint to the apparatus is extremely short, oftentimes in the neighborhood of less than one-fourth of an inch. This requirement entails an extremely complex problem of holding a joint and applying a tremendous amount of heat in order to properly seal the joint to the apparatus.

A further problem that must be solved in order to meet the requirement of a perfect seal is the maintenance of the dimension of the glassware and glass ball stem during the application of the intense heat. Air pressure, when applied to the inside of the vessel and the tube and stem, will prevent collapse of the vessel and the glass tubing while the sealing operation is being performed. The usual method for sealing glass joints is to use a mating glass joint which may or may not be wrapped in asbestos and clamp the joints together using the standard C-type spring loaded glass ball joint clamp. However when this assembly was clamped in a chuck as is normally the procedure for sealing joints, and the chuck rotated while the heat was being applied, the off-center weight of the C-type clamp resulted in lopsided joints. Further, the clamps and the method of holding the joints was unsatisfactory because of the inability to perfectly align the joints. Thus, a joint was usually formed that was unsatisfactory.

It is, therefore, an object of this invention to provide a glass ball joint holder that will securely hold a male or female-type glass ball joint accurately so that either can be applied to glassware apparatus without becoming lopsided.

It is a further object of this invention to provide a glass ball joint holder that will permit air pressure within the joint being sealed and the glassware thereby maintaining the walls and seal at a uniform glass thickness, and further, to prevent the walls of the vessel from collapsing during the application of heat.

It is a still further object of this invention to provide a glass ball joint holder that will rapidly and easily clamp a glass ball joint during an extremely short sealing operation.

It is a still further object of this invention to provide a glass ball joint holder that not only can be clamped within a chuck but also can be connected to a source of air pressure whereby a glass ball joint may be maintained in precise arrangement with a glass workpiece while superatmospheric pressure is maintained inside both the workpiece and the glass joint.

This invention features a glass ball joint holder which is made by incorporating a long cylindrical hollow tube; one end of the hollow tube is adapted to either be held in the hand or clamped in the chuck of a lathe or other similar device. The remaining end of the cylindrical tube has a second tube attached thereto of smaller outside diameter. An annular ring fits over the smaller diameter and against the shoulder formed by the narrowing of the outer diameter. A collar slips over the larger diameter. A plurality of resilient spring members have one end mounted to the collar and the remaining end bent to form an inward facing which is adapted to clamp or hold the glass ball joint. A spring or other device is used to urge the collar away from the annular ring thereby securely clamping or holding the glass ball joint.

In order to use the holder, the collar is forced forward toward the annular ring which spreads the resilient fingers apart. The glass ball joint is then pressed against the annular ring and the collar released. The spring will force the collar away from the annular ring and the hooks down and tightly against the lip of the glass ball joint. The device is then either ready for being sealed to any desired location on a piece of glassware, either by holding the tube by hand or by inserting the tube in the chuck of a lathe. Air pressure, in either case, may be applied within the glass ball joint and within the apparatus by applying air through the tube and into the apparatus.

Further objects, features and advantages of this invention will become apparent from the following description and claims when read in view of the accompanying drawings, in which:

Figure 1:
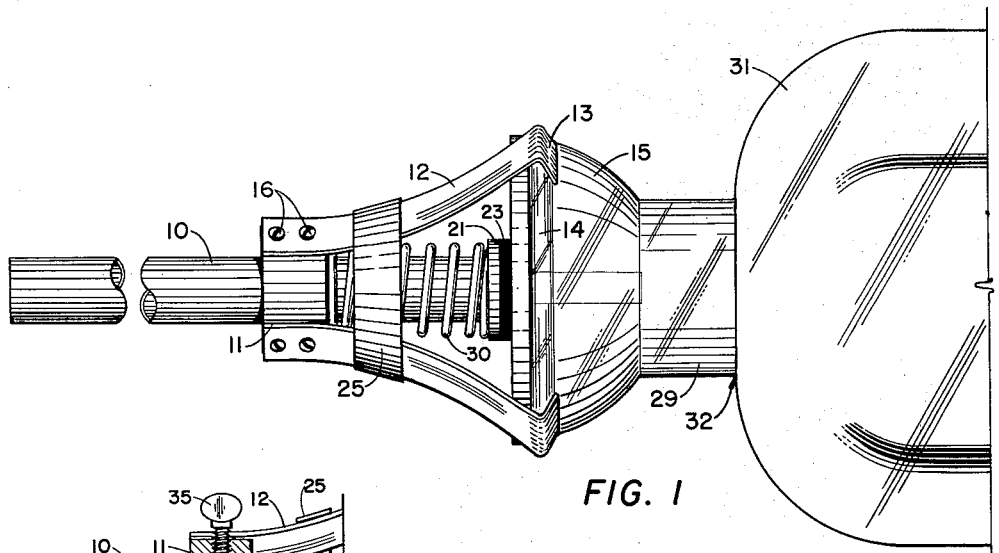
FIGURE 1 shows a glass ball joint holder connected to a glass ball joint which is being applied to an apparatus.
Figure 2:
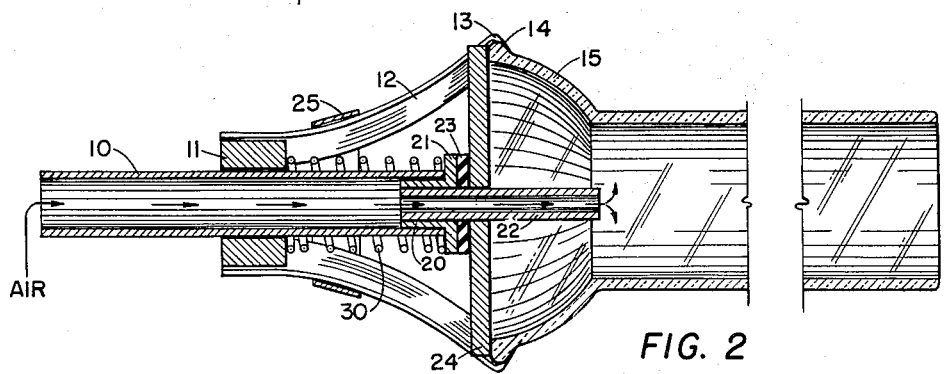
FIGURE 2 is a cross-sectional view of the holder shown in FIGURE 1.

Referring to the figures, and in particular to FIGURES 1 and 2, a glass ball joint holder is illustrated wherein a tube 10 has an annular ring or collar 11 slidably mounted thereon. Mounted to collar 11 are a plurality of resilient fingers 12. One end of resilient fingers 12 is mounted to the periphery of collar 11 by means of screws 16. The other end of resilient fingers 12 is bent to form a hook 13 which is adapted to clamp a flange 14 of a glass ball joint 15. Inserted within one end of tube 10 is an insert 20 having a flange 21 on its outer end in abutting relationship with the end of tube 10. Insert 20 has an axial opening therethrough adapted to receive a second tube 22 therein which is rigidly secured thereto. A ring or annular washer 24 which may be of stainless steel is slidably placed over tube 22. A rubber or Teflon gasket 23 is placed between annular washer 24 and flange 21. A frusto-conical sleeve 25 surrounds fingers 12 and is adjustable axially in order to alter tension on fingers 12. A biasing spring 30 of the helical type is mounted around tube 10 and between the inner wall of flange 21 and collar 11.

*Operation*

In order to securely clamp a glass ball joint 15 in the glass ball joint holder, collar 11 is forceably pressed toward washer 24. Glass ball joint 15 is then pressed against washer 24. As collar 11 is moved toward washer 24, resilient fingers 12 will spread permitting the glass ball joint 15 to be inserted snugly against the washer. Collar 11 is then released and the hooks 13 will grip flange 14 of the glass ball joint and force it securely against washer 24. The biasing spring 30 will forcibly retain the glass ball joint against washer 24. The glass ball joint holder may then be lifted by tube 10 and a glass ball stem 29 pressed against a flask or other device 31 that is to have the glass ball joint secured thereto. Heat will then be applied against joint 32. In order to prevent the walls of flask 31, stem 29 or joint 32 from collapsing or changing dimensions from the intense heat required to fuse the glass stem to the flask 31, air will be forced down the internal opening of tube 10 (see FIGURE 2) in the direction of the arrows. The air pressure will then build up within the flask and the stem tube preventing it from collapsing during the heating process. Gasket 23 provides a little resilience between washer 24 and flange 21. Gasket 23 also helps to seal the space between washer 24 and tube 22, thereby aiding and maintaining the air pressure within the system. It is obvious, of course, if sufficient air pressure is available, this seal is not needed, since escape of air would not then be harmful. Perfect alignment of the glass ball joint with the axis of tube 10 is easily maintained since the springs or resilient fingers 12 are located or spaced equally about collar 11. It is generally preferable that washer 24 be maintained at approximately the same size as the end of glass ball joint 15. This will then assure that the hooks 13 or resilient fingers 12 clamp securely about flange 14. Also, it is important that washer 24 be large enough that it seals the end of the glass ball joint and prevents the escape of air. The proper size will also assist in maintaining perfect axial alignment of the glass ball joint with the center of tube 10.

As was previously mentioned, the glass ball joint holder can be held by hand for operations that are inconvenient to clamp in a lathe; however, it is extremely convenient to clamp the end of tube 10 opposite from the holder in a lathe and apply air to the internal portion of the tube 10 through the usual rotating joint well known in the glass blowing art.

Figure 3:
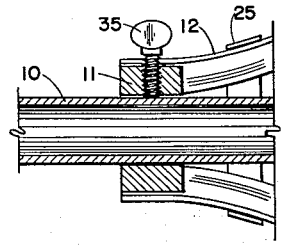
FIGURE 3 is a cross-sectional view of a portion of the device shown in FIGURE 1 showing a second method for holding the collar.

Referring to FIGURE 3, another method is shown for clamping collar 11 to tube 10, thereby securely holding the glass ball joint against washer 24. Rather than a spring 30 as shown in FIGURES 1 or 2, a wing nut 35 is used. It is obvious, of course, that the resilient fingers 12 and hooks 13 must then maintain the pressure necessary to hold the glass ball joint against washer 24. While this system is obviously not quite as satisfactory or convenient as that shown in the preferred embodiment of FIGURE 1, it is equally applicable and in some instances may be found preferable wherein an excessive amount of weight is present on the glass ball joint as would be the case of extremely large joints.

In a preferred embodiment of this invention, tube 10 was constructed of one-half inch diameter tubing, approximately twelve inches long. The smaller tubing 22 was constructed of hollow tubing of approximately one-eighth inch in diameter. Washer 24 was selected to cover a one and one-half inch female ball joint and was made of stainless steel. Gasket 23 was formed of rubber. Fingers 12 were made of beryllium copper approximately three inches long and three-eighths inch wide and screwed to collar 11. The helical spring 30 was cut to a length sufficient to provide bias against collar 11 without a glass ball joint inserted. The spring provides sufficient pressure against the joint when the collar was pressed forward sufficiently to surround flange 14.

Figure 4:
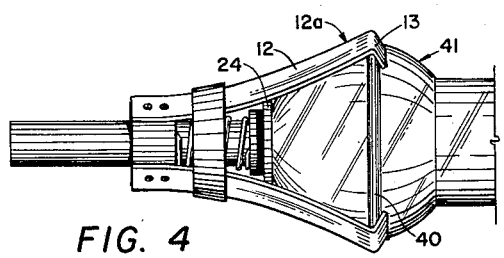
FIGURE 4 shows a male joint clamped by modifying the length of the fingers of the embodiment shown in FIGURE 1.

Throughout the specification, the description of the holder has been limited to a female type glass ball joint. However, referring to FIGURE 4, a male glass ball joint may be just as easily held by extending the length of fingers 12 past the washer 24 by an amount 12a sufficient to clamp a lip 40 of the joint 41. The operation and use of this modified holder remain the same as that previously described.

Although this invention has been described with respect to particular embodiments thereof, it is not to be so limited, as changes and modifications may be made therein which are within the spirit and scope of the invention as defined by the appended claims.

We claim:
1. A glass ball joint holder comprising: a first cylindrical elongated tube, a second tube axially aligned with said first tube, having a uniform external diameter less than that of said first tube to form a step therebetween; a collar slidably mounted on a portion of the tube having the larger diameter; a plurality of resilient finger means each having one end secured to the periphery of said collar and the other end having a hook formed toward the axis of said cylindrical tubes; an annular ring slidably mounted on a portion of the tube having the smaller diameter whereby motion of said ring toward said collar is arrested by said step; and, biasing means urging said collar away from said annular ring; whereby, a glass ball joint pressed against said annular ring with said smaller diameter tube protruding therein may be retained against said annular ring by expanding the hook end of said resilient fingers around the lip of said glass ball joint thereby securely holding said joint to said holder.

2. A glass ball joint holder comprising:
(a) first and second axially aligned, elongated cylindrical tubes, said second cylindrical tube being of smaller external diameter than said first tube thereby forming a step therewith;
(b) an annular ring slidably placed over the tube of smaller diameter and adapted to be lodged against said step;
(c) a second annular ring slidably mounted around the tube of larger diameter;
(d) resilient finger means having one end uniformly secured to the periphery of said second annular ring and extending toward said first annular ring; and
(e) hook means in the opposite ends of said resilient finger means adapted to engage the lip of a glass ball joint and retain said joint against said first annular ring.

3. A glass ball joint holder comprising:
(a) first and second axially aligned, cylindrical tubes said second tube being of a smaller uniform diameter than said first tube thereby forming a step between said tubes;
(b) a collar means slidably mounted on the first tube;
(c) elongated finger means of resilient material attached at one end to the periphery of said collar means and extending toward the tube of smaller diameter, the remaining end of said finger means having a hook extending toward the axis of the tubes;
(d) an annular ring slidably mounted on said second tube and having a diameter larger than the diameter of said glass ball joint; and
(e) means for adjustably securing the position of said finger means;
whereby a glass ball joint pressed against said annular ring with the smaller of said tubes extending into said joint will be secured thereto by placing the hooked portion of said finger means over the lip of said glass ball joint and operating said last named means to secure the position of said hook on the finger means against said lip.

4. A device as described in claim 3 wherein said means for adjustably securing said finger means comprises a helical spring having one end against said collar means and means attached to the first cylindrical tube for restraining the other end of said spring, whereby said spring urges said collar means away from said annular ring.

5. A holder as defined in claim 3 wherein said means for adjustably securing said finger means comprises a screw threadably inserted through said collar normal to the axis of said tubes and whereby tightening of said screw rigidly secures said collar to said first cylindrical tube.

6. A glass ball joint holder comprising first and second, axially aligned, cylindrical tubes, said second tube being of a smaller diameter than said first tube whereby a step is formed between said tubes, an annular ring slidably mounted normal to the axis of said second tube in a position to abut said step, a collar slidably mounted on said first tube, a plurality of resilient fingers, each of which has one end secured to the periphery of said collar and the other end formed into a hook extended toward the longitudinal axis of said tubes, said fingers being oriented with the axis of said cylindrical tubes and extending toward said annular ring, and means for securing the position of said fingers with respect to said annular ring.

7. A device as defined in claim 6 wherein said means for securing the position of said fingers comprises a helical spring having one end against said collar and means attached to the first cylindrical tube for restraining the other end of said spring, whereby said spring urges said collar away from said annular ring.

8. A holder as defined in claim 6 wherein said means for securing the position of said fingers comprises a screw threadably inserted through said collar normal to the axis of said tubes whereby tightening of said screw rigidly secures said collar to said first tube.

References Cited in the file of this patent

UNITED STATES PATENTS

| 233,672 | Haley | Oct. 26, 1880 |
| 634,276 | Shaw | Oct. 3, 1899 |